April 2, 1963   W. B. CRAWFORD ETAL   3,083,409
DESTRUCTIBLE MANDREL FOR HOLLOW VESSELS
Filed Feb. 14, 1961   4 Sheets-Sheet 1
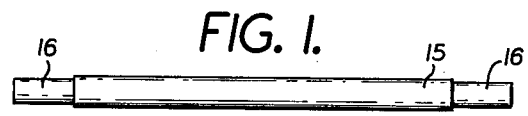
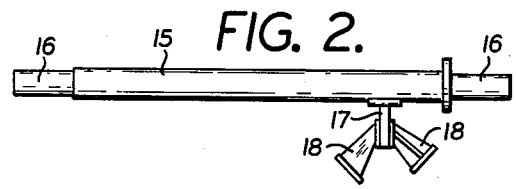
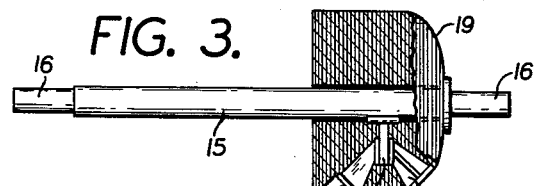
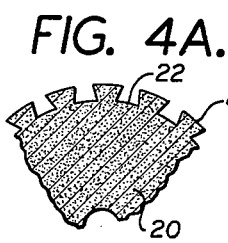
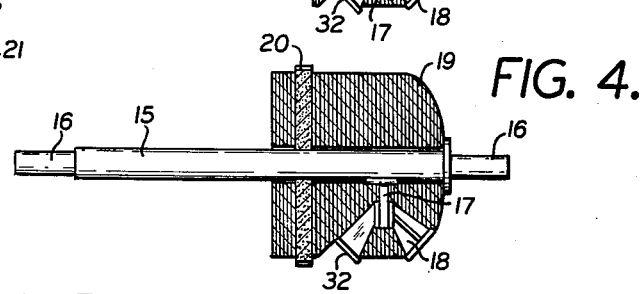
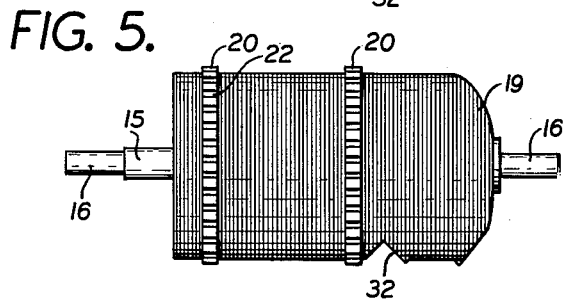
INVENTORS
WILLIAM B. CRAWFORD
DONALD V. HITZFIELD
BENJAMIN H. SCOTT
BY
*Arthur L. Johnston*
ATTORNEY.

April 2, 1963   W. B. CRAWFORD ETAL   3,083,409
DESTRUCTIBLE MANDREL FOR HOLLOW VESSELS
Filed Feb. 14, 1961   4 Sheets-Sheet 2
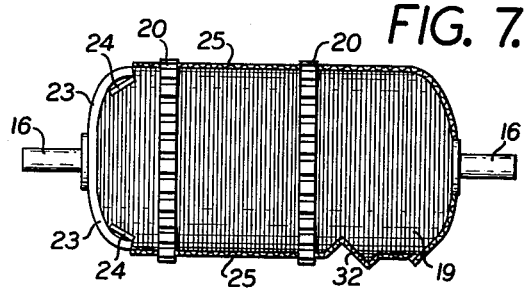
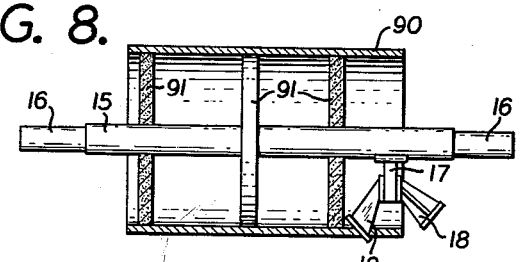
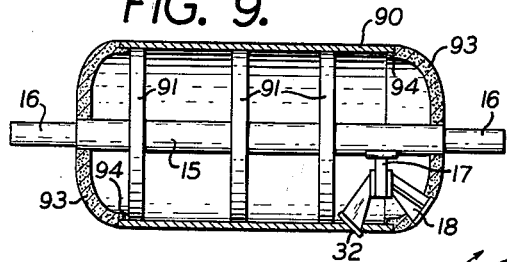
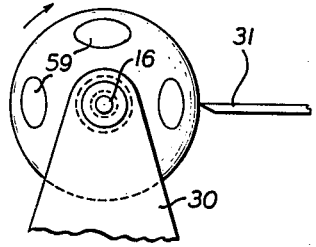
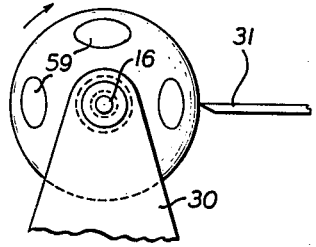
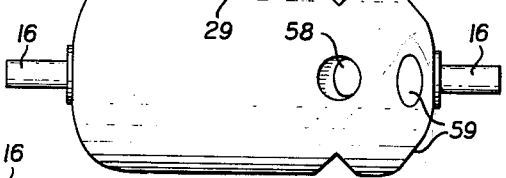
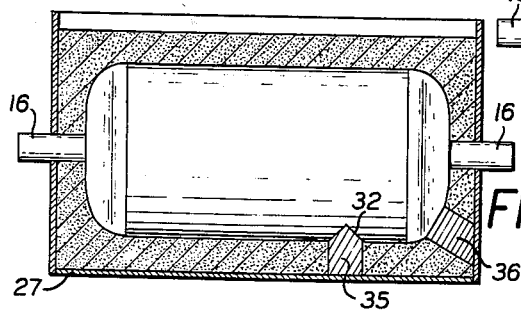
INVENTORS
WILLIAM B. CRAWFORD
DONALD V. HITZFIELD
BENJAMIN H. SCOTT
BY Arthur L. Whinston
ATTORNEY.

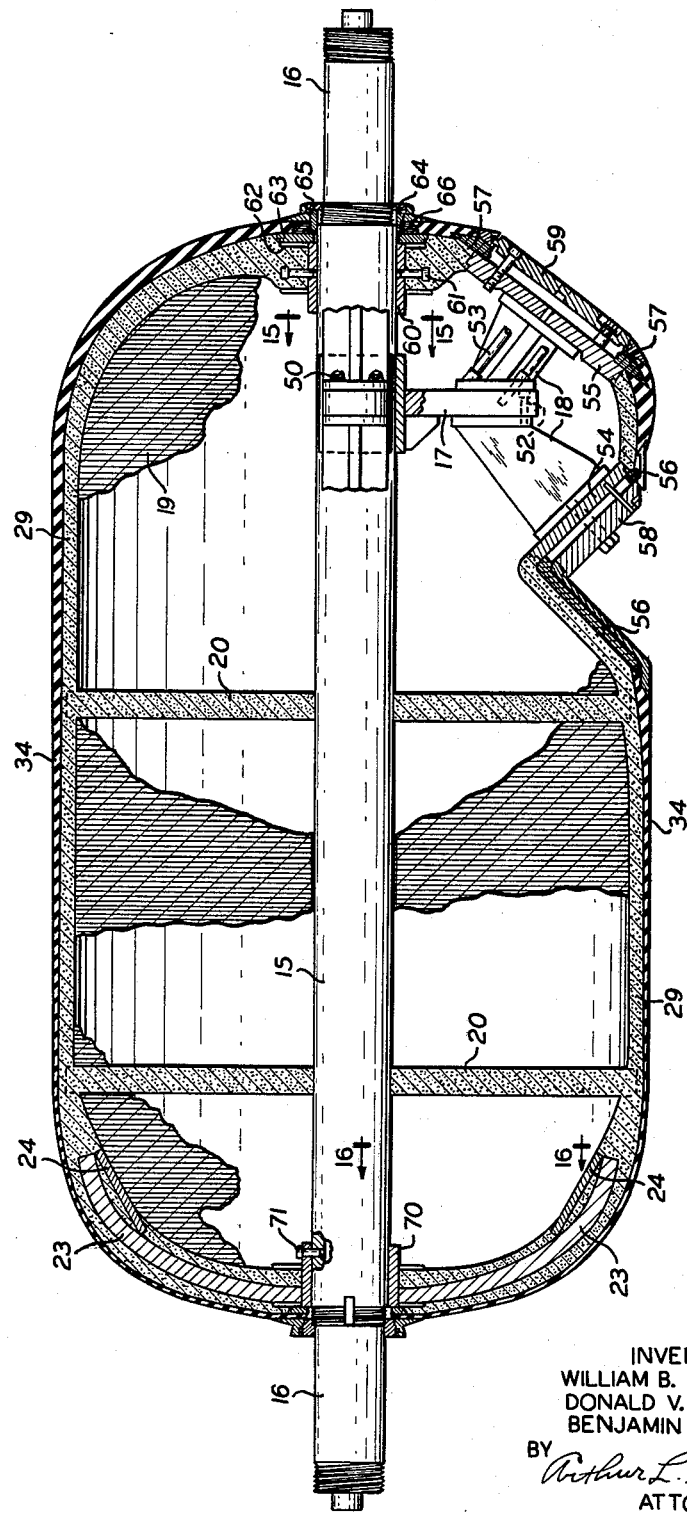

April 2, 1963 W. B. CRAWFORD ETAL 3,083,409
DESTRUCTIBLE MANDREL FOR HOLLOW VESSELS
Filed Feb. 14, 1961 4 Sheets-Sheet 4
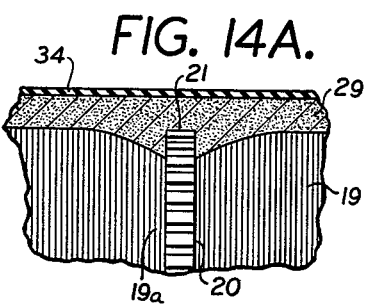
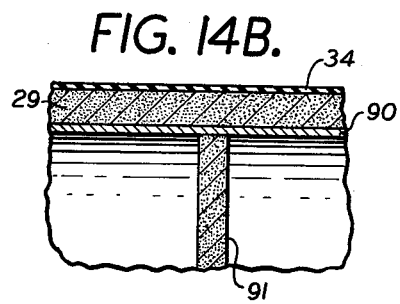
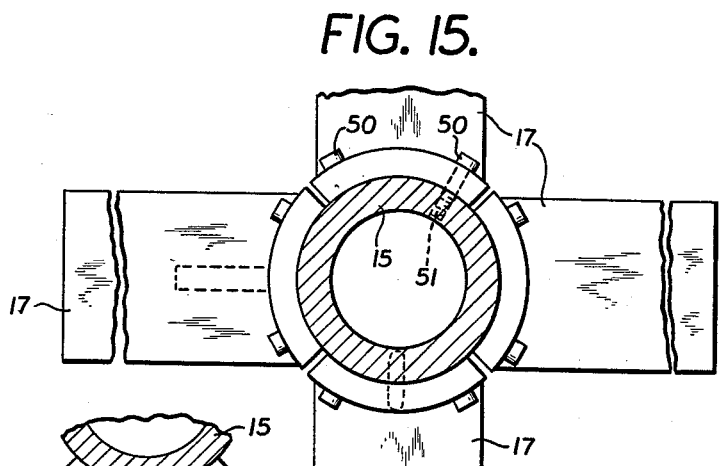
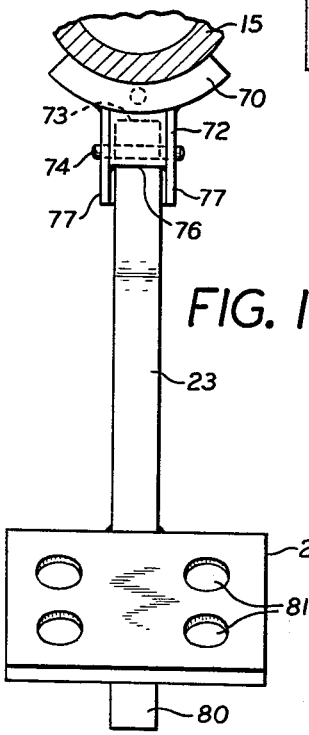
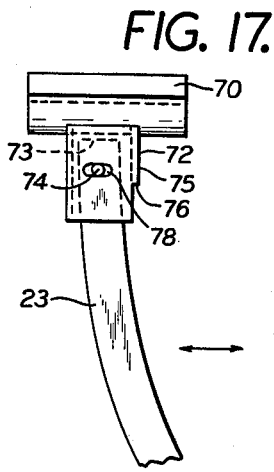
INVENTORS
WILLIAM B. CRAWFORD
DONALD V. HITZFIELD
BENJAMIN H. SCOTT
BY
*Arthur L. Whinston*
ATTORNEY.

United States Patent Office 3,083,409
Patented Apr. 2, 1963

3,083,409
DESTRUCTIBLE MANDREL FOR HOLLOW VESSELS
William B. Crawford, Mishawaka, Donald V. Hitzfield, South Bend, and Benjamin H. Scott, Mishawaka, Ind., assignors to United States Rubber Company, New York, N.Y., a corporation of New Jersey
Filed Feb. 14, 1961, Ser. No. 89,289
6 Claims. (Cl. 18—45)

This invention relates to a mandrel for building hollow vessels and, more particularly, to a mandrel for such vessels having at least one port in the wall thereof.

Hollow vessels of this type are used very often as fuel cells, for example, as elastomeric insulator cases for the solid fuels used in guided missiles. The vessels are characterized by the extremely close tolerances to which they are built and, further, by having very accurately located thrust ports in at least one end thereof.

A problem has existed concerning the proper type of mandrel on which to build such insulator cases. The mandrel must be capable of holding in precise relationship the frames for the above-mentioned ports and must also provide an extremely accurate surface on which the case can be built. Since it is preferable to have the mandrel remain in the insulator case during fabrication and through final cure and machining, the mandrel must be strong, yet reasonably light in weight. The strength must be adequate to withstand the pressure produced by the windings used to reinforce the insulator case, yet the weight must be such as will permit ready transportation of the assembly. Furthermore, it must be possible to remove the mandrel from the finally constructed insulator case through one or more of the ports thereof without damaging the case in any way. Thus the mandrel must be readily destructible.

Accordingly, it was our object to provide a destructible mandrel which would meet these criteria and thus be satisfactory for use in making the above-described insulator cases. It was a further object to devise a suitable method of making such mandrels, which method would be quick and economical and adapted to the complex structure ultimately to be built thereupon.

In accordance with these objects, we have invented a destructible mandrel for hollow vessels of the type described, said vessels being characterized by having at least one port in the wall thereof. Our mandrel comprises a central shaft, a jig attached to the shaft and a frame for the port supported at the end of the jig, the frame being located in the region of the surface of the mandrel. The mandrel further comprises a cardboard core mounted axially on the shaft and a layer of frangible plaster material around the core and forming the surface of the mandrel, the layer being disposed around and interrupted by the frame for the port.

Since the amount of plaster material used makes the surface layer quite heavy, a plurality of arms are generally attached to the central shaft, the arms extending outwardly to the plaster surface layer so as to be bonded therein, thus furnishing needed support.

Our method of making the destructible mandrel comprises mounting a cardboard core axially on the central shaft, centering the core in a mold, the inner dimensions of which are larger than the finally-desired dimensions of the mandrel, casting a frangible plaster material in the space between the mold and the core, thus to form a surface layer of plaster therearound, and then machining the plaster surface layer down to the finally-desired size.

The invention having been broadly described, a more detailed description is given hereafter with reference to the accompanying drawings, wherein:

FIGS. 1–13 depict the various steps which comprise the method of making the destructible mandrel, FIGS. 3–7 showing one intermediate sequence of steps and FIGS. 8 and 9 showing an alternate sequence, FIG. 13 being an elevational view, partly in section, of the completed article;

FIG. 14 is a detailed sectional view of the mandrel constructed according to the sequence of steps shown in FIGS. 1–7 and 10–12;

FIG. 14A is a sectional view showing an alternative type of construction for the mandrel of FIG. 14;

FIG. 14B is a sectional view showing the construction that would result from the sequence of method steps shown in FIGS. 8 and 9;

FIG. 15 is a sectional view, with parts broken away, taken along line 15—15 of FIG. 14;

FIG. 16 is a sectional view taken along line 16—16 of FIG. 14; and

FIG. 17 is a side view of part of the supporting arm shown in FIG. 16, showing the means of attachment to the central shaft.

Referring to the drawings and in particular to the sequence of steps illustrated by FIGS. 1–13, the mandrel itself is built up on a hollow central shaft 15, which is illustrated schematically in FIG. 1. Shaft 15 may conveniently be made of steel and has ends 16 of reduced diameter, which are used to support the mandrel, as in the above-mentioned mold.

If the hollow vessels are to have ports in the walls thereof, one or more jigs 17 may be attached, as by bolting, to shaft 15 to furnish support at the surface of the mandrel for the necessary frames for the ports. Jigs 17 may conveniently support bracket type fittings 18, which locate said frames accurately. This is as shown in FIG. 2. It must be understood, however, that since hollow vessels of this type are generally provided with a variety of fittings through which access may be had to the vessel's interior, such fittings being in the nature of annular seats or bushings for hand holes, flanged tubular parts for connection with inlet, discharge, vent or drainage ducts, or the like, that jigs 17 and brackets 18 may support a variety of objects for ultimate incorporation in the walls of the vessel. The ports described herein are, thus, only an illustrative example of the same. Also, although FIG. 2 shows only one such jig 17, it must be understood that any number of such supporting structures may be attached to the central shaft 15 and, in fact, where missile insulator cases are concerned, there will be, in general, four such jigs 17 disposed radially about shaft 15, thus to support a number of frames. (See FIGS. 14 and 15.)

After the attachment of the necessary jigs 17 and brackets 18, the cardboard core may be built up in a variety of ways. FIGS. 3–7 illustrate one such way, in which a plurality of annular cardboard discs 19 are slipped over shaft 15, thus to form the core.

Discs 19 may be cut out of a single sheet of cardboard, or they may be made up of two halves, which are subsequently glued together about the shaft. FIG. 3 is an elevational view, partly in section, which illustrates the central shaft 15 with the jigs 17 and brackets 18 attached and a number of cardboard discs 19 in place. It must be understood, of course, that discs 19 are cut in the region of jigs 17 to accommodate the same and that this necessarily involves a careful fitting job.

Since some support for the plaster surface layer is generally required, one or more rigid annular supporting discs 20 are mounted on shaft 15 in between cardboard discs 19. FIG. 4 illustrates how one such rigid disc 20 is placed on the shaft after a number of cardboard discs 19 are already in place.

Rigid discs 20 may conveniently be made of fully cured plaster, as, for example, plaster of Paris, or they may be made of plaster board, or any destructible type material and they are of a diameter slightly larger than the cardboard discs 19 adjacent to them. Thus, plaster discs 20 protrude slightly beyond cardboard discs 19, as shown. If the immediately adjacent cardboard discs 19a are cut down in size, discs 20 may be the same size as the rest of cardboard discs 19. (See FIG. 14A.) In any event discs 20 are of lesser diameter than the finally-desired mandrel, so as not to interfere with the necessary machining operation above described. In practice we have found it convenient to make plaster discs 20 extend about one inch beyond the edge of the adjacent cardboard discs 19.

As shown in FIG. 4A, discs 20 are preferably notched along the peripheral edge 21 thereof, thus to form a series of dove-tailed serrations 22 therealong. The serrations 22 make it possible for the plaster which is cast in the space between the mold and the core of the mandrel to interlock securely with discs 20.

FIG. 5 shows the partially completed core in elevation, with two plaster discs 20 in place in between the tightly packed cardboard discs 19. It must be understood, however, that more or less than two rigid discs 20 may be used, depending on the size and type of mandrel to be constructed.

Since the amount of plaster material used in the surface layer of the mandrel is usually quite heavy, a plurality of arms 23, as, for example, four such arms, are attached to shaft 15 by bolting or other means. Arms 23 are preferably curved (see FIGS. 6, 14 and 17) and may have plates 24 welded or otherwise attached to the ends thereof. Plates 24 are adapted to be bonded into the plaster surface layer, as will be hereinafter described.

Arms 23 are attached to shaft 15 in such a manner as to permit a limited amount of rotation about an axis perpendicular to shaft 15. They are also attached so as to permit a slight amount of longitudinal motion with respect to shaft 15. Thus, they furnish a yieldable support for the plaster surface layer. This is necessary in order to prevent cracking of the plaster during the final curing thereof.

After all the cardboard discs 19 are in place, a layer 25 of lightweight open-mesh fabric is wrapped around cardboard discs 19. Care is taken not to cover the plaster discs 20, thus not to interfere with the necessary bond between them and the plaster surface layer. The fabric, which, for example, can be a net or knit construction, is used to prevent plaster from seeping in between or into the cardboard discs 19. This step is shown in FIG. 7.

FIGS. 8 and 9 illustrate another way in which the core of the mandrel can be constructed up to this point. As shown in FIG. 8, instead of using a plurality of cardboard discs 19, the core can be made of a hollow tube of cardboard 90. Tube 90 is maintained in position by one or more rigid annular support discs 91, as shown. Discs 91 may desirably be made of plaster or plaster board, as above described, but they understandably do not protrude out beyond tube 90. FIG. 8 shows tube 90 in place, supported by three such plaster discs 91.

The ends of the core can be closed by two pre-cast, cup-shaped plaster end domes 93, as shown in FIG. 9. End domes 93 are fitted in under tube 90 by means of a circumferentially-extending projecting lip 94.

It must be understood, of course, that numerous other ways of constructing the cardboard core could be devised, FIGS. 3–7 and 8–9 illustrating but two possibilities. In any event, the assembled core structure is then placed in a mold, as, for example, the two-part mold 26 shown schematically in FIG. 10, and is centered therein by means of shaft ends 16. The inner dimensions of mold 26 are larger than the finally-desired dimensions of the mandrel. This is to permit the cast surface layer to be machined down accurately to final size.

Mold 26 may be made of "Vibrin" brand polyester resin. It can be made in two halves, joined in the middle, and, if so constructed, is provided with a pour slot 28 running approximately its full length, as shown in FIG. 10.

The mold, however, can be of even simpler construction. FIG. 11 illustrates schematically how sheet metal 27 may be wrapped loosely around the built-up core structure, thus to form a space in which to cast the oversize plaster surface layer.

A frangible plaster material, such as plaster of Paris, is then cast in the space between the mold and the core. The plaster material flows around the notched protruding plaster discs 20 (should the method of FIGS. 3–7 be used) and forms a layer 29 around the core, which is securely interlocked with the peripheral edges 21. The plaster surface layer 29 is also bonded to arms 23 and plates 24, as shown in FIG. 14. Thus, ample support is furnished for layer 29.

Where a port in the final vessel is to be recessed, as shown at 32 in FIG. 13, some provision must be made for preventing flow of plaster material into the space thereby formed. This can be conveniently accomplished by means of any suitably designed removable fitting 33, as illustrated in FIG. 10, or by similar fittings 35 and 36 in FIG. 11.

Where the cardboard disc and open-mesh fabric method of FIGS. 3–7 is used, a thin layer of plaster may desirably be coated over fabric layer 25, as by hand, before the assembled core structure is placed in the mold. This will insure a good bond between surface layer 29 and fabric layer 25.

Although plaster of Paris has been mentioned as a suitable material for layer 29, it must be understood that other materials or other plaster formulations may be used. The material must have sufficient strength to be able to withstand the stresses imposed during the building of the hollow vessels. It must also be able to withstand the temperatures reached during curing of the vessels. Furthermore, the material must be easily breakable, so as to be removed from the interior of the vessels upon completion of the same. Thus, any moldable, frangible material should be satisfactory, conventional plaster of Paris being but one example. It should also be understood that various paper, pulp or fiber fillers or extenders may be added to the plaster material without interfering in any way with the process of construction.

The plaster surface layer is then permitted to set in the mold for approximately six hours at room temperature. This achieves a partial set, as will be evident to those skilled in the art.

At this point the mandrel is removed from the mold and mounted in a lathe 30 by means of shaft ends 16. The partially wet plaster layer 29 is machined down to approximately final size, as illustrated by FIG. 12. The machining is done, for example, by bringing a formed template or a machine tool 31 up against the plaster while rotating the mandrel on the lathe in the usual manner. The central portion of the mandrel may be shaped by means of a straight edge template or again by a movable tool 31.

The approximate-sized mandrel is then dried to the desired moisture level in a hot room or drying oven, in accordance with conventional plaster of Paris curing techniques. This treatment leaves the surface layer 29 suitable for the final machining operation.

The surface of the mandrel is then carefully machined down to final size. Again, this can be done on a lathe, as in FIG. 12.

After the mandrel has been thus cured and brought to final size, a single layer of rubber 34 is placed thereover, as shown in section in FIG. 13. Rubber layer 34 is conveniently covered with a parting agent, such as a coating of polyvinyl alcohol, by painting, spraying or rolling an aqueous solution thereof on the surface of the rubber. The insulator case can then be built up on rubber layer 34 and no bond will occur between the case and the rubber. Thus, rubber layer 34 forms a strippable liner for the final insulator case and prevents adherence of plaster to the interior thereof, which might contaminate the fuel contained. The insulator case can conveniently be built up on the mandrel in accordance with the disclosure of U.S. patent application Serial No. 36,396, filed June 15, 1960, by Uhlig, Buffington, King and Brooks.

FIGS. 14, 14A, 14B and 15–17 disclose additional details of construction. Jigs 17 are bolted to shaft 15 by radially-extending bolts 50, which extend into tapped holes 51. (See FIG. 15.) Brackets 18 are, in turn, fastened to jigs 17 by additional bolts 52 and 53, as shown.

Brackets 18 support inner support plates 54 and 55. The frames 56 and 57 are held in position between inner support plates 54 and 55 and the respectively mounted outer support plates 58 and 59. This is shown in FIG. 14.

A collar 60 is preferably mounted near the ends of shaft 15, as shown. Collar 60 is attached by means of bolts 61, which extend into plaster surface layer 29 to prevent rotation of the same during the above-described machining operations. Support plates 62 and 63 are mounted on shaft 15 exteriorly of collar 60 and are held in position by a sleeve 64 and nut 65. The assembly can also be used to hold a frame 66 in position, frame 66 being adapted to define an axial port in the insulator case.

FIG. 14 shows the internal construction that results from the method of FIGS. 3–7, i.e., using the cardboard discs 19 and protruding plaster support discs 20. Plaster surface layer 29 is shown integral with the notched peripheral edge 21.

FIG. 14A shows the construction that results from cutting down the cardboard discs 19a immediately adjacent plaster disc 20, disc 20 being essentially the same size as the majority of cardboard discs 19.

FIG. 14B shows a detail of the surface construction that results from the method of FIGS. 8 and 9, i.e., using the hollow tube 90 and support discs 91.

FIGS. 16 and 17 disclose details of supporting arms 23. Arms 23 are themselves attached to brackets 70, which are bolted to shaft 15 by bolts 71.

Arms 23 are designed to furnish yieldable support for plaster surface layer 29. As such, they are attached to brackets 70 by means of box fittings 72, as shown. The inner ends 73 of arms 23 are attached to fittings 72 by means of pins 74. Side 75 of box fitting 72 is cut back as at 76 to permit arms 23 a predetermined amount of rotation.

In addition, pins 74 are attached to sides 77 of box fittings 72 by means of elongated holes 78. This permits arms 23 to have a limited amount of longitudinal motion. The net result is that plaster surface layer 29 is given a yieldable type of support. This is especially important in view of the fact that plaster and steel have different coefficients of thermal expansion and, without some means of compensating therefor, cracks would result in the plaster during final curing of the same.

Plates 24 are welded to the radially outer ends 80 of arms 23. Plates 24 are provided with drilled holes 81 to permit the cast plaster material to form a strong bond therewith.

We have thus disclosed a new mandrel for building close tolerance hollow vessels and a new method of making the same. Our mandrel is capable of holding in precise relationship the various fittings or frames which are ultimately built into the final vessel. The mandrel is strong, reasonably light in weight and well balanced and, due to its construction, may be relatively easily removed from the interior of the hollow vessel upon completion of the latter. Finally, the machined surface of the mandrel permits the vessel to be constructed with the proper degree of precision.

Having thus described our invention, what we claim and desire to protect by Letters Patent is:

1. A destructible mandrel for hollow vessels, said vessels being characterized by having at least one port in the wall thereof, comprising a central shaft; a jig attached to said shaft; a frame for said port supported at the end of said jig; a cardboard core mounted axially on said shaft; a layer of frangible plaster material around said core and forming the surface of said mandrel, said layer being disposed around and interrupted by said frame for said port; and at least one rigid annular support disc mounted on said shaft to support said layer with respect to said shaft.

2. A destructible mandrel as in claim 1, further comprising a plurality of arms attached to said shaft, said arms extending outwardly to said plaster surface layer and being bonded therein, said arms furnishing support for said layer.

3. A destructible mandrel as in claim 2, in which said arms are limitedly rotatable about an axis perpendicular to said shaft, and longitudinally movable with respect to said shaft.

4. A destructible mandrel for hollow vessels, said vessels being characterized by having at least one port in the wall thereof, comprising a central shaft; a jig attached to said shaft; a frame for said port supported at the end of said jig; a hollow, tubular cardboard core mounted axially on said shaft; at least one rigid annular support disc mounted on said shaft interiorly of said core, thus to form a support for the same; and a layer of frangible plastic material around said core and forming the surface of said mandrel, said layer being disposed around and interrupted by said frame for said port.

5. A destructible mandrel for hollow vessels, said vessels being characterized by having at least one port in the wall thereof, comprising a central shaft; a jig attached to said shaft; a frame for said port supported at the end of said jig; a plurality of annular cardboard discs placed in abutting relation on said shaft, thus to form a core for said mandrel; at least one rigid annular support disc mounted on said shaft in between said cardboard discs, said rigid disc being of slightly larger diameter than adjacent cardboard discs, thus to protrude therebeyond; and a layer of frangible plaster material around said core and forming the surface of said mandrel, said layer being disposed around and interrupted by said frame for said port, said layer being interlocked with the peripheral edge of said protruding rigid disc.

6. A destructible mandrel as in claim 5, in which said peripheral edge of said protruding rigid disc is notched to form a dove-tailed serrated surface therealong.

References Cited in the file of this patent
UNITED STATES PATENTS

| 1,670,557 | Wettstein | May 22, 1928 |
| 2,303,303 | Schleicher | Nov. 24, 1942 |
| 2,331,000 | Schaefer | Oct. 5, 1943 |